(12) United States Patent
Sharma et al.

(10) Patent No.: US 12,151,429 B2
(45) Date of Patent: Nov. 26, 2024

(54) INFLATABLE STRUCTURE AND METHOD OF MAKING INFLATABLE STRUCTURE

(71) Applicant: Wichita State University, Wichita, KS (US)

(72) Inventors: Bhisham Sharma, Wichita, KS (US); William Johnston, Wichita, KS (US)

(73) Assignee: WICHITA STATE UNIVERSITY, Wichita, KS (US)

( * ) Notice: Subject to any disclaimer, the term of this patent is extended or adjusted under 35 U.S.C. 154(b) by 0 days.

(21) Appl. No.: 18/068,301

(22) Filed: Dec. 19, 2022

(65) Prior Publication Data

US 2023/0226748 A1 Jul. 20, 2023

Related U.S. Application Data

(60) Provisional application No. 63/291,784, filed on Dec. 20, 2021.

(51) Int. Cl.
*B29C 64/118* (2017.01)
*B33Y 10/00* (2015.01)
*B33Y 80/00* (2015.01)

(52) U.S. Cl.
CPC ............ *B29C 64/118* (2017.08); *B33Y 10/00* (2014.12); *B33Y 80/00* (2014.12)

(58) Field of Classification Search
CPC ........ B29C 64/118; B33Y 10/00; B33Y 80/00
See application file for complete search history.

(56) References Cited

U.S. PATENT DOCUMENTS

| | | | |
|---|---|---|---|
| 10,589,671 B1* | 3/2020 | Ali | B60N 2/976 |
| 2014/0134378 A1* | 5/2014 | Downs | B29C 33/76 |
| | | | 156/196 |
| 2016/0031164 A1* | 2/2016 | Downs | B29C 66/721 |
| | | | 428/12 |
| 2020/0223165 A1 | 7/2020 | Vitek et al. | |
| 2021/0154913 A1* | 5/2021 | Hikmet | B29C 64/209 |

OTHER PUBLICATIONS

Han et al., 3D Printing Firm Inflatables with Internal Tethers, Chi '21 Extended Abstracts, May 2021, 7 pages.
Kim et al., Tendon constrained inflatable architecture; rigid axial load bearing design case, Smart Materials and Structures, Mar. 24, 2021, 22 pages.

* cited by examiner

*Primary Examiner* — Nahida Sultana
*Assistant Examiner* — Mohamed K Ahmed Ali
(74) *Attorney, Agent, or Firm* — Stinson LLP

(57) ABSTRACT

In an inflatable structure, a plurality of fibers is formed in a cavity of a flexible shell. When structure is inflated, the shell expands and the fibers are tensioned to constrain the flexible shell to have a fiber-constrained shape. When the structure is uninflated, the flexible shell is configured to collapse. The structure is formed by additive manufacturing. The fibers are fused to the shell and can run in various directions in relation to each other and the flexible shell. Fibers can extend obliquely to the shell when tensioned and at crosswise directions in relation to each other to form a nonwoven mesh.

18 Claims, 26 Drawing Sheets

INFLATABLE STRUCTURE AND METHOD OF MAKING INFLATABLE STRUCTURE

CROSS-REFERENCE TO RELATED APPLICATION

This application claims priority to U.S. Provisional Patent Application No. 63/291,784, which is hereby incorporated by reference in its entirety.

FIELD

This disclosure generally pertains to inflatable structures, and more specifically to a class of inflatable structures that achieve dimensional accuracy and structural resilience while inflated.

BACKGROUND

Inflatable structures derive their shape, stiffness, and load carrying capabilities from pressurized air within a tensioned elastic shell. The pressurized air provides a compressional and flexural stiffness to the structure and causes biaxial tensioning of the skin, allowing it to achieve a targeted shape. Inflatable structures are currently underutilized for structural engineering applications due to the challenges associated with designing and fabricating complex and dimensionally accurate structures, the challenge of achieving appropriate stiffness properties, and the challenge of predicting an inflatable structure's deformation response under external loads. Therefore, the inventors have recognized a need for an improved inflatable structure and method for producing inflatable structures that overcome these challenges.

SUMMARY

In one aspect, an inflatable structure comprises a flexible shell having an internal surface defining a cavity and an external surface. The inflatable structure is inflatable from an uninflated configuration to an inflated configuration. When the inflatable structure is in the uninflated configuration, the flexible shell is configured to collapse. And when the inflatable structure is in the inflated configuration, the flexible shell is configured to expand. A plurality of fibers are in the cavity of the flexible shell. Each fiber has a first end portion and a second end portion and a length extending from the first portion to the second portion. The first end portion of each fiber is fused to the flexible shell at a respective first location along the flexible shell, and the second end portion is fused to the flexible shell at a respective second location along the flexible shell. When the flexible shell is collapsed, the fibers are configured to be non-tensioned. And when the shell is expanded, the fibers are configured to be tensioned and thereby constrain the flexible shell to have a fiber-constrained shape.

An inflatable structure comprises a flexible shell having an internal surface defining a cavity and an external surface. The inflatable structure is inflatable from an uninflated configuration to an inflated configuration. When the inflatable structure is in the uninflated configuration, the flexible shell is configured to collapse. And when the inflatable structure is in the inflated configuration, the flexible shell is configured to expand. A fibrous mesh is in the cavity of the flexible shell. The fibrous mesh includes a plurality of fibers joined to the flexible shell such that when the shell is expanded, the fibers are configured to be tensioned and thereby constrain the flexible shell to have a fiber-constrained shape. The plurality of fibers includes at least a first grouping of fibers and a second grouping of fibers, the first grouping of fibers being transverse to the second grouping of fibers when the shell is expanded.

In another aspect, an inflatable structure comprises a flexible shell having an internal surface defining a cavity and an external surface. The inflatable structure is inflatable from an uninflated configuration to an inflated configuration. When the inflatable structure is in the uninflated configuration, the flexible shell is configured to collapse. And when the inflatable structure is in the inflated configuration, the flexible shell is configured to expand. A plurality of fibers is in the cavity of the flexible shell. Each fiber has a first end portion, a second end portion, and a length extending from the first end portion to the second end portion. The first end portion of each fiber meets the flexible shell at a respective first fiber joint region of the flexible shell and the second end portion meets the flexible shell at a respective second fiber joint region of the flexible shell. When the flexible shell is collapsed, the fibers are configured to be non-tensioned. And wherein when the shell is expanded, the fibers are configured to be tensioned so that at least some of the fibers are oriented so that their first end portions are oblique to the respective first fiber joint regions.

In another aspect, a method of making an inflatable structure comprises additively manufacturing a flexible shell of the inflatable structure and additively manufacturing a plurality of fibers within the flexible shell so that the fibers are configured to constrain the shell to have a fiber-constrained shape when the flexible shell is expanded.

Other aspects will be in part apparent and in part pointed out hereinafter.

BRIEF DESCRIPTION OF THE DRAWINGS

Corresponding parts are given corresponding reference characters throughout the drawings.

DETAILED DESCRIPTION

Figure 1:
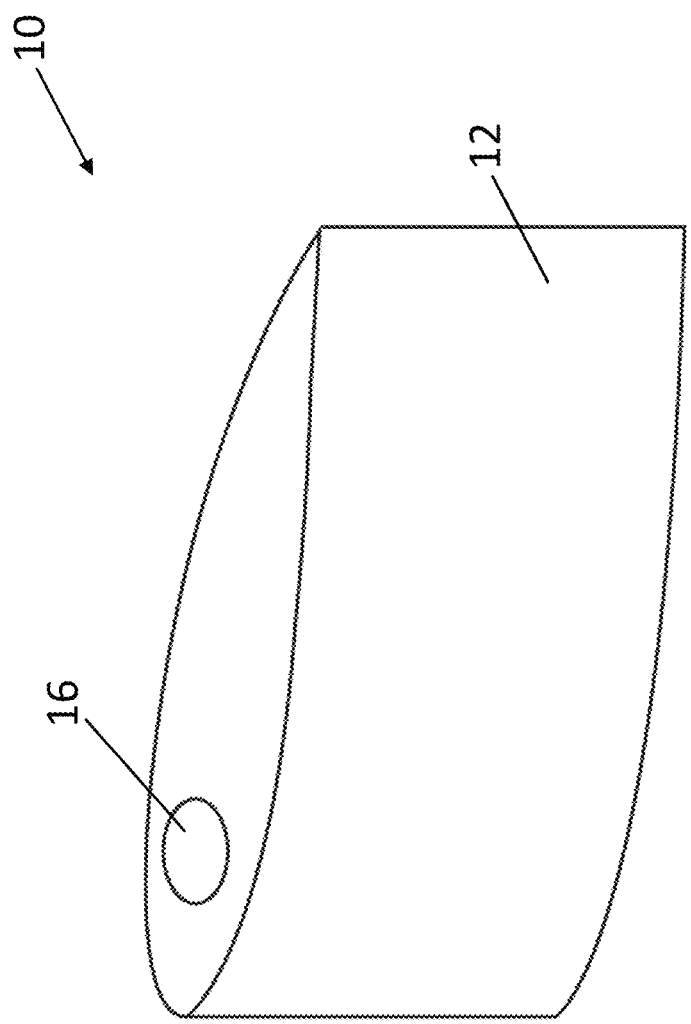
FIG. 1 is a perspective of an inflatable structure in accordance with the present disclosure, illustrating the structure in an inflated configuration.
Figure 1:
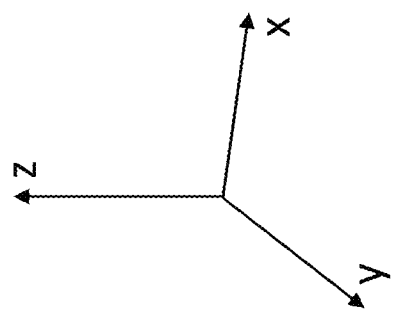
Figure 2:
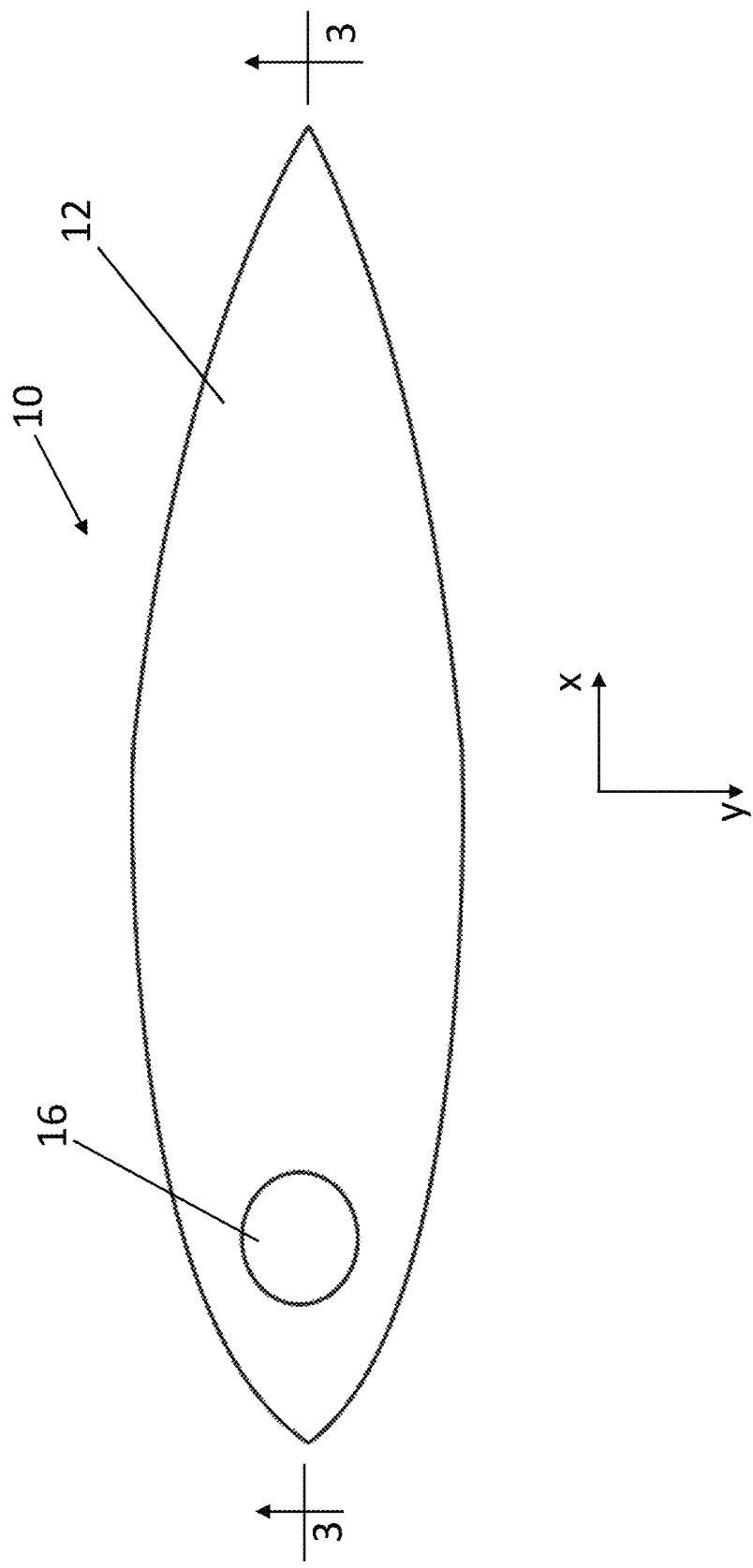
FIG. 2 is a top plan view of the inflatable structure of FIG. 1.

Referring to FIGS. 1-6, an exemplary embodiment of an inflatable structure in the scope of this disclosure is generally indicated at reference number 10. The inflatable structure 10 broadly comprises an external shell 12 and plurality of fibers 14 disposed in the shell. As explained in further detail below, the fibers 14 are configured to be tensioned when the inflatable structure 10 is inflated, whereby the fibers constrain the shell 12 to hold a pre-defined fiber-constrained shape. FIGS. 1-6 depict an inflatable structure 10 that has a fiber-constrained shape of an airfoil. But as will be explained in further detail below, the principles of this disclosure can be adapted for inflatable structures of virtually any conceivable shape. As compared with inflatable structures of the prior art, the inventors believe that inflatable structures according to the present disclosure can have more accurate and/or more complex inflated shapes and improved resilience under external load.

The shell 12 comprises a flexible membrane that completely surrounds an internal cavity 15. The shell 12 has an internal surface directly exposed to the cavity and an outer surface opposite the internal surface. In some embodiments, the external surface of the shell 12 is directly exposed to ambient environment. In other embodiments, the external shell is covered with another layer of material (e.g., a sealing layer). Inflatable structure 10 is broadly configured to selectively receive pressurized gas (typically, pressurized air) inside the shell 12, whereby the inflatable structure inflates. In exemplary embodiments, the shell 12 is further configured to selectively release the pressurized gas from the cavity 15, whereby the inflatable structure 10 becomes uninflated such that it is collapsible for stowage.

The shell 12 is formed from by additive manufacturing of a flexible material (e.g., thermoplastic polyurethane (TPU), polylactic acid (PLA), or acrylonitrile butadiene styrene (ABS)). In an exemplary embodiment, the shell 12 is formed in a fused deposition modeling (FDM) process. In another exemplary embodiment, the shell 12 is formed in a fused filament fabrication (FFF) process. The shape of the shell 12 can be defined by the conventional x-y-z Cartesian coordinate system used in additive manufacturing. Thus, in one or more embodiments, the shell 12 is made up of a plurality of layers of extruded molten filament deposited in respective XY planes such that the layers are distributed along the z-axis. In one or more embodiments, the shell 12 forms a contiguous wall that completely circumscribes an interior volume (also called a cavity).

Figure 7:
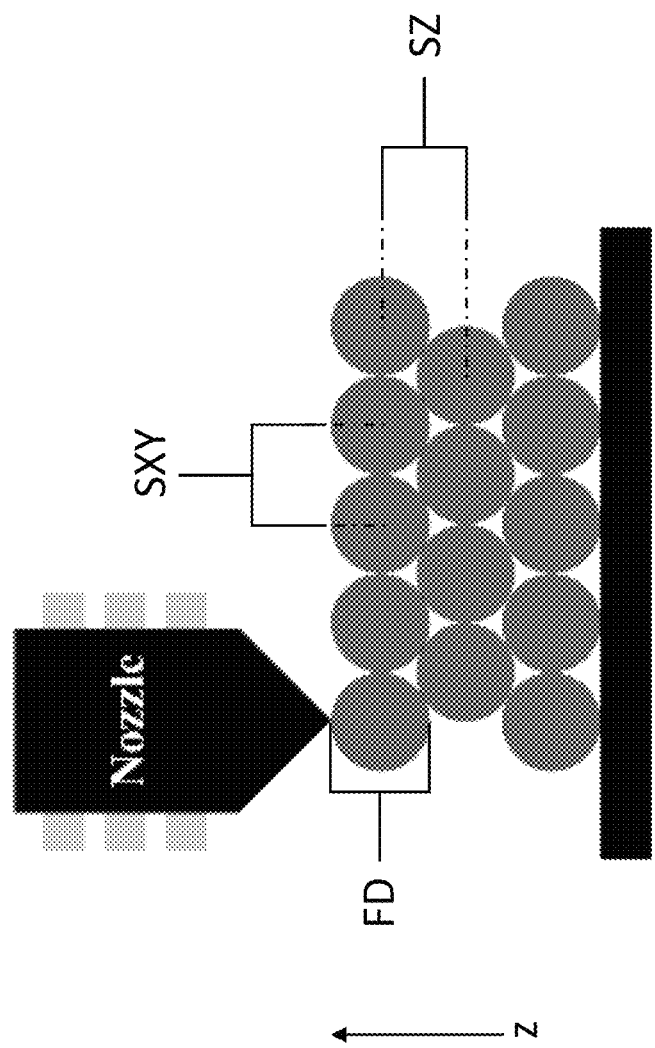
FIG. 7 is a schematic illustration of an additive manufacturing nozzle forming a shell of an inflatable structure at zero raster distance.
Figure 8:
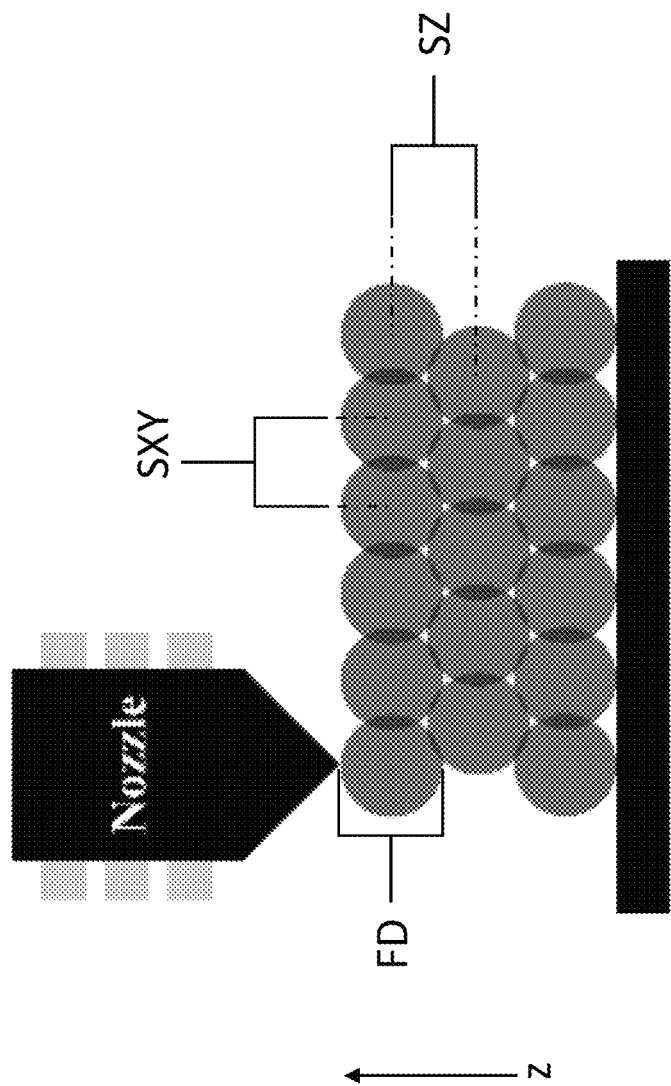
FIG. 8 is a schematic illustration similar to FIG. 7, but wherein the shell of the inflatable structure has negative raster distance.

In certain embodiments, the shell 12 is completely airtight as formed. But in other embodiments, an airtight coating can be applied to the shell after it is additively manufactured. To promote air tightness, the shell wall can be additively manufactured so that the entire shell has a wall thickness that is a plurality filaments-thick (e.g., at least three filaments-thick, at least 5 filaments-thick, etc.). In an exemplary embodiment, the shell 12 is formed in an additive manufacturing process in which the intra-layer raster distance of each shell layer is zero or negative and the inter-layer raster offset maximizes interfacial bonding by maximizing layer contact area. FIG. 7 provides a schematic cross-sectional illustration of an additively manufactured structure formed at zero raster distance, and FIG. 8 provides a similar illustration of an additively manufactured structure formed at negative raster distance. As shown in FIG. 7, at zero raster offset, the z-axis spacing SZ of each filament layer is equal to the diameter FD of the filament and the in-plane spacing SXY of each course of filament in a given layer is also equal to the filament diameter. By contrast, as shown in FIG. 8, at negative raster offset, the z-axis spacing SZ of each filament layer is less than the filament diameter and/or the in-plane spacing SXY of each course of filament in a given layer is less than the filament diameter.

The flexible shell 12 is configured to be selectively stowable and deployable. When the inflatable structure 10 is in the uninflated configuration (FIG. 5), the flexible shell 12 is configured to collapse for stowage. For example, in one or more embodiments, the uninflated inflatable structure 10 is foldable. When the inflatable structure 10 is in the inflated configuration (FIGS. 1-4), the flexible shell 112 is configured to expand (e.g., for deployment). The fibers 14 constrain the shell 12 when inflated so that the shell conforms to its fiber-constrained shape. The fibers 14 can maintain the fiber-constrained shape of the shell at a wide range of inflation pressures. The combination of the additively manufactured shell 12 and the constraining fibers 14 inside the shell allow for complex inflated geometries. For example, in one or more embodiments, the inflated shell 12 can comprise one or more flat surfaces, one or more sharp edges, one or more sharp corners, and/or one or more locally concave regions on an exterior surface of the shell. Those skilled in the art will recognize that these types of shapes are very difficult to achieve in conventional inflatable structures. In certain embodiments, the principles of this disclosure can also be employed to produce locally resonant inflatable metamaterials.

Figure 6:
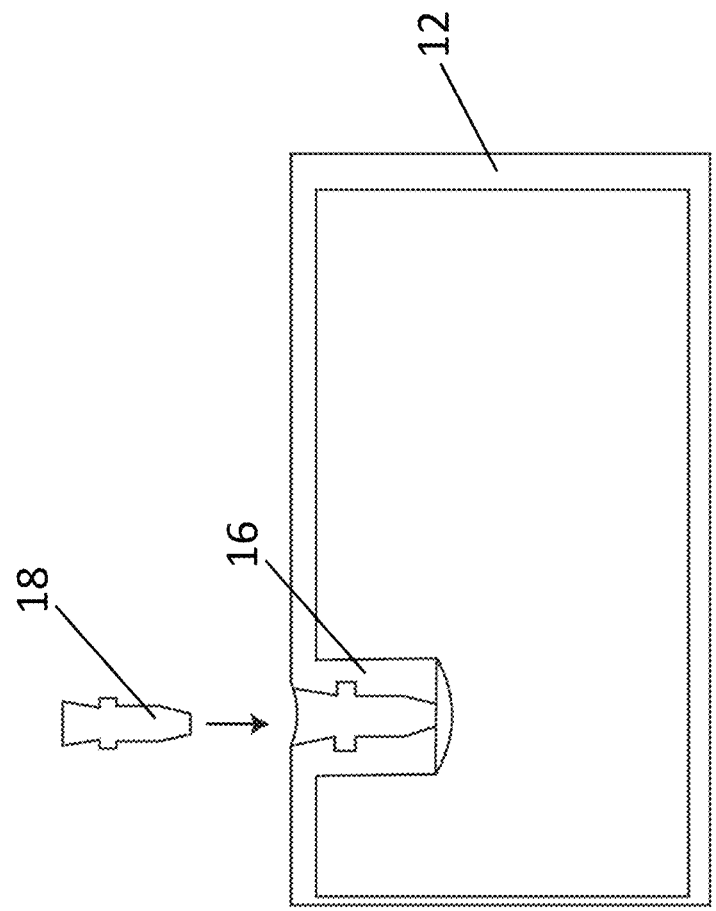
FIG. 6 is an exploded cross-sectional schematic illustration showing how an inflation valve can mount in the inflatable structure.

In an exemplary embodiment, the shell 12 is formed with an integral valve retainer 16. As shown in FIG. 6, the valve retainer 16 can be configured to operatively mount any available type of inflation valve 18 on the shell 12 so that the inflatable structure 10 can be inflated via the valve.

Referring again to FIGS. 1-5, each of the fibers 14 comprises a thin, elongate strand of material extending from a first end portion joined to the shell 12 at a respective first fiber joint region (broadly, a respective first location) to an opposite second end portion joined to the shell 12 at a respective second fiber joint region (broadly, a respective second location). In one or more embodiments, each of the fibers has a maximum fiber thickness of less than or equal to the extrusion nozzle diameter used during FFF or FDM. As can be seen from FIGS. 3 and 4, the lengths of the fibers 14 will vary depending upon the locations of the respective first and second joint regions along the shell 12. The fibers 14 are generally flexible with some degree of tensile strength. While very high tensile strength fibers such as carbon fibers or glass fibers could be used for certain applications, the inventors believe that lower tensile strength fibers can also be used to achieve the desired shape-constraining function in many embodiments. As will be explained in further detail below, the fibers 14 are produced in way that enables very large numbers of fibers to be joined to the shell in a wide array of orientations. By appropriately selecting the number and orientation of fibers, inflatable structures can be formed with complex inflated geometries constrained by the fibers.

Preferably, the fibers 14 are additively manufactured with the shell 12, e.g., in an FDM or FFF process. The process for additively manufacturing the fibers 14 is described in further detail below. But structurally, the additive manufacturing process forms a single-filament fiber across the internal cavity 15 of the shell 12 and joins the end portions of the fibers to the shell by fusion. Accordingly, the first end portion of each fiber 14 is fused to the flexible shell at a respective first fiber joint region (broadly, a first location) of the flexible shell 12 and the second end portion fused to the flexible shell at a respective second fiber joint region (broadly, a second location) of the flexible shell. The fibers 14 do not penetrate the shell 12.

Figure 3:
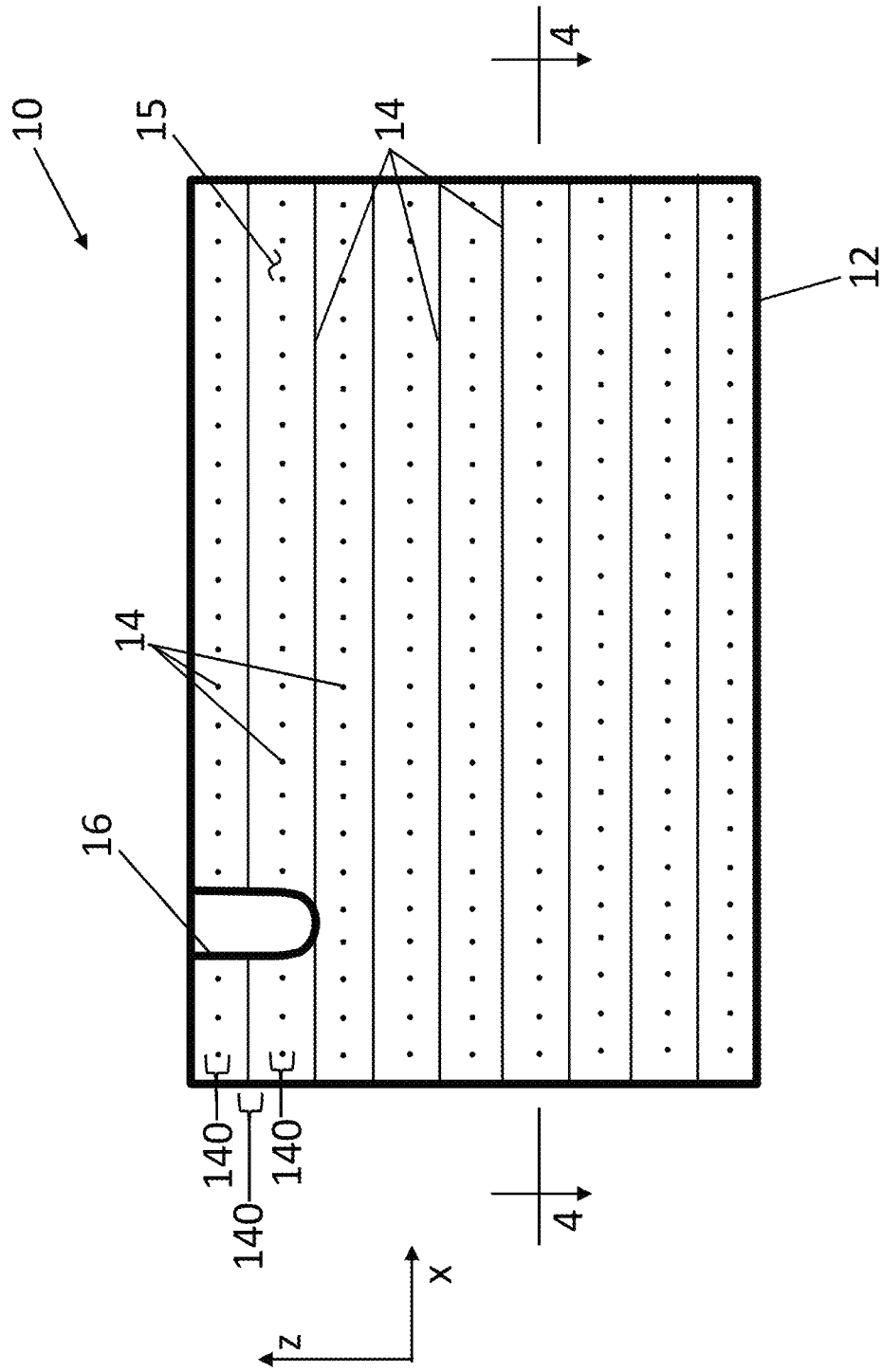
FIG. 3 is a cross section taken in the plane of line 3-3 of FIG. 2.
Figure 4:
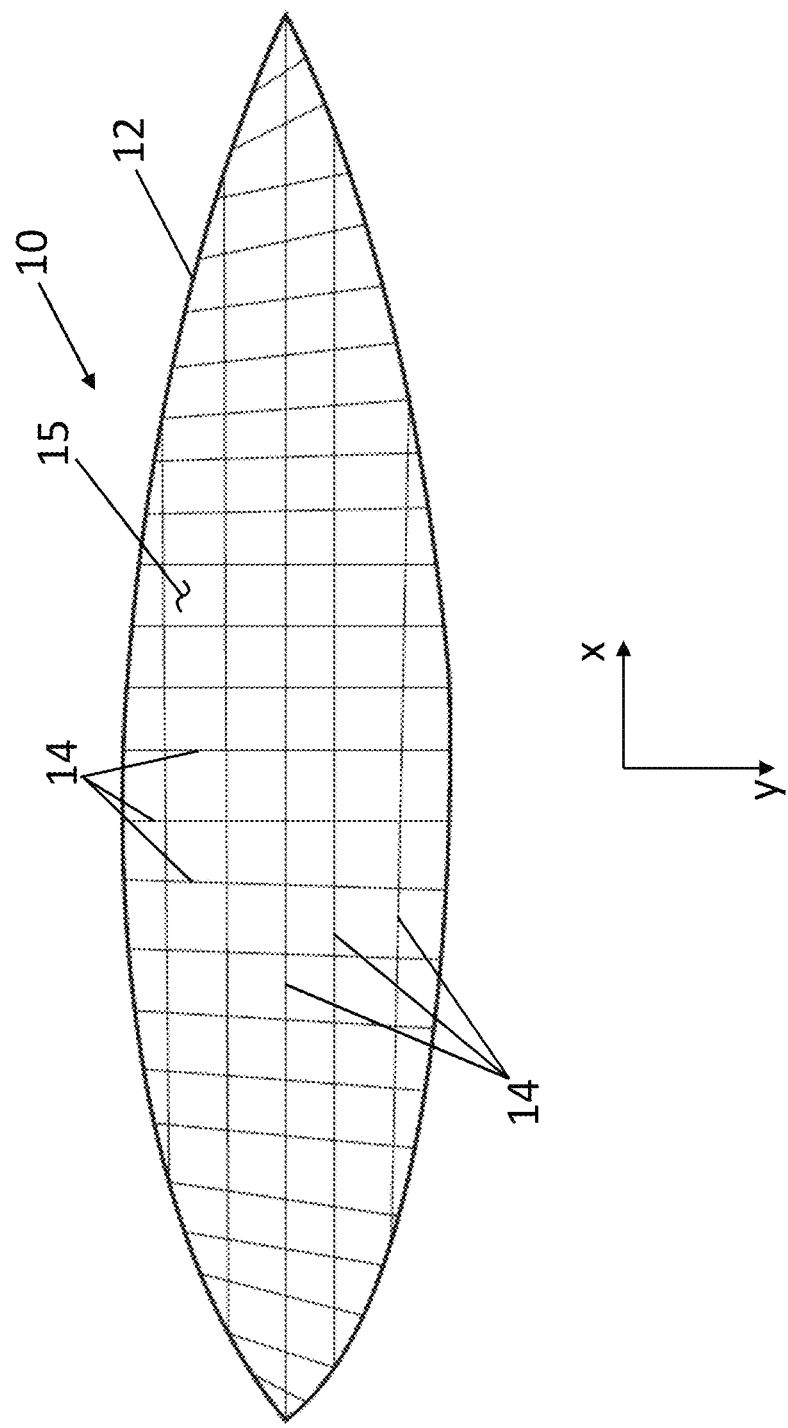
FIG. 4 is a cross section taken in the plane of line 4-4 of FIG. 3.
Figure 5:
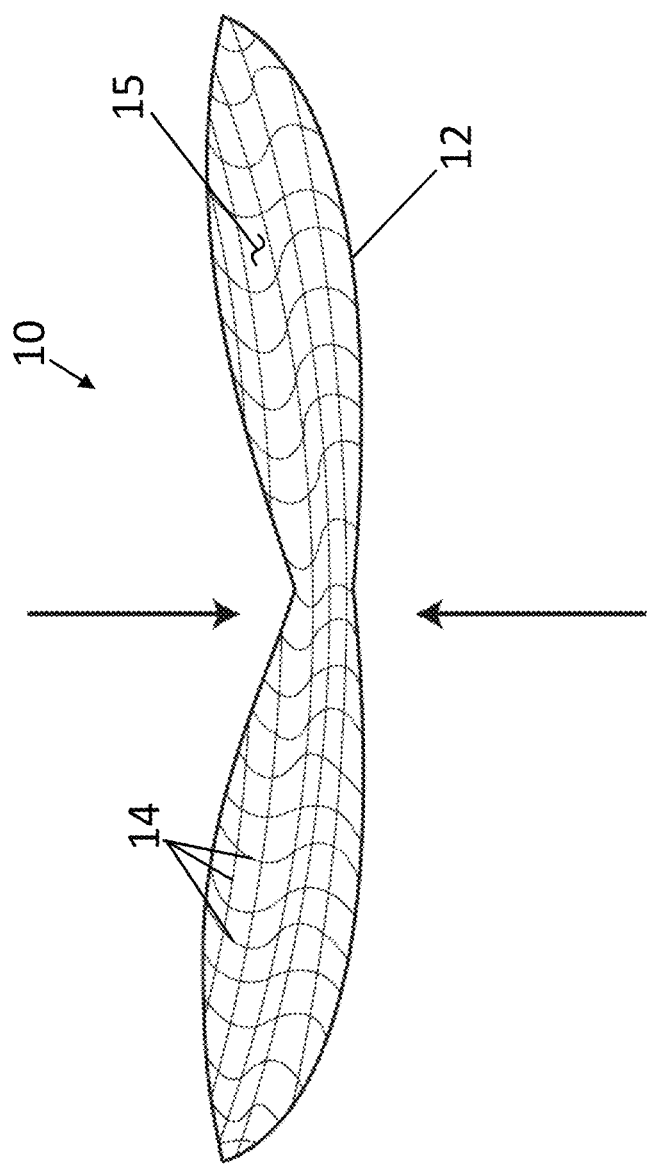
FIG. 5 is a cross section similar to FIG. 4 but showing the structure in an uninflated configuration.

As shown in FIG. 3, the inflatable structure 10 has a plurality of distinct fiber layers 140 spaced apart along the z-axis. Each fiber layer 140 extends in a respective XY plane and comprises a plurality of fibers 14 substantially confined to the respective XY plane. Because of the additive manufacturing techniques used to make the fibers 14, the fibers in any given layer can be parallel or non-parallel. By way of example, in the cross section of FIG. 4, the top layer of fibers 140 runs generally along the y-axis, but it can be seen that the middle fibers in this layer are substantially parallel to the y-axis whereas the fibers towards the ends of the inflatable structure are skewed from the y-axis. By contrast, the layer of fibers 140 below the top layer shown in FIG. 4 are all parallel to the x-axis. Thus, it can be seen that the fibers in different layers 140 can be oriented transverse to one another to form a nonwoven "fibrous mesh" inside the shell 12. Thus, it can be seen that the principles of this disclosure allow for a wide range of fiber distributions. In certain embodiments, when the shell 12 is expanded, the fibers 14 are configured to be tensioned so that at least some of the fibers are oriented so that their first end portions are oblique to the respective first fiber joint regions. (e.g., the fibers extending in a more y-axis direction near the cross-sectional ends of the shell are oblique to the shell joint regions where they meet the shell, whereas the y-axis fibers near the cross-sectional middle of the shell are substantially perpendicular to the joint regions where they meet the shell).

Figure 9:
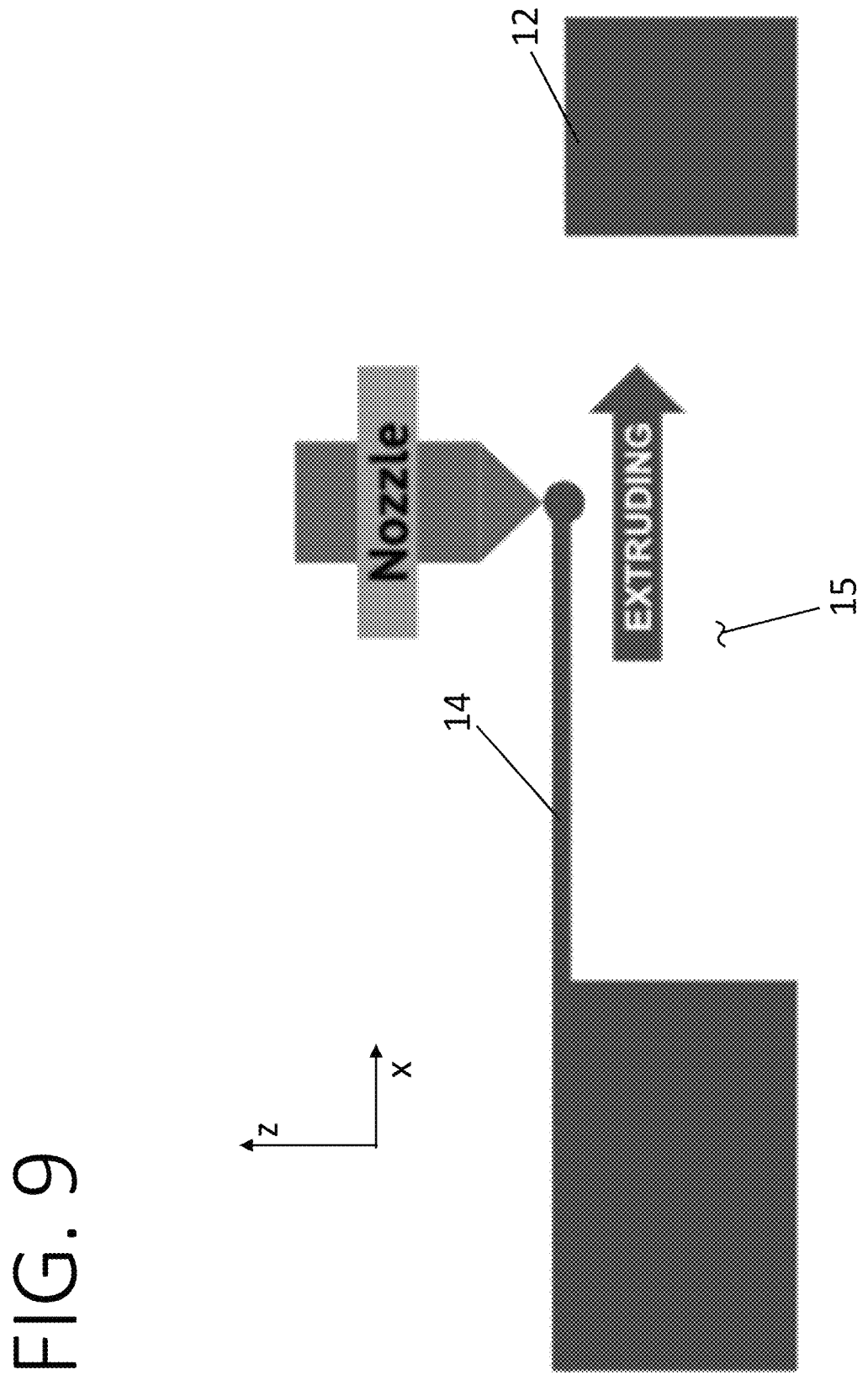
FIG. 9 is a schematic illustration of an additive manufacturing nozzle forming a fiber of an inflatable structure using a bridging method.
Figure 10:
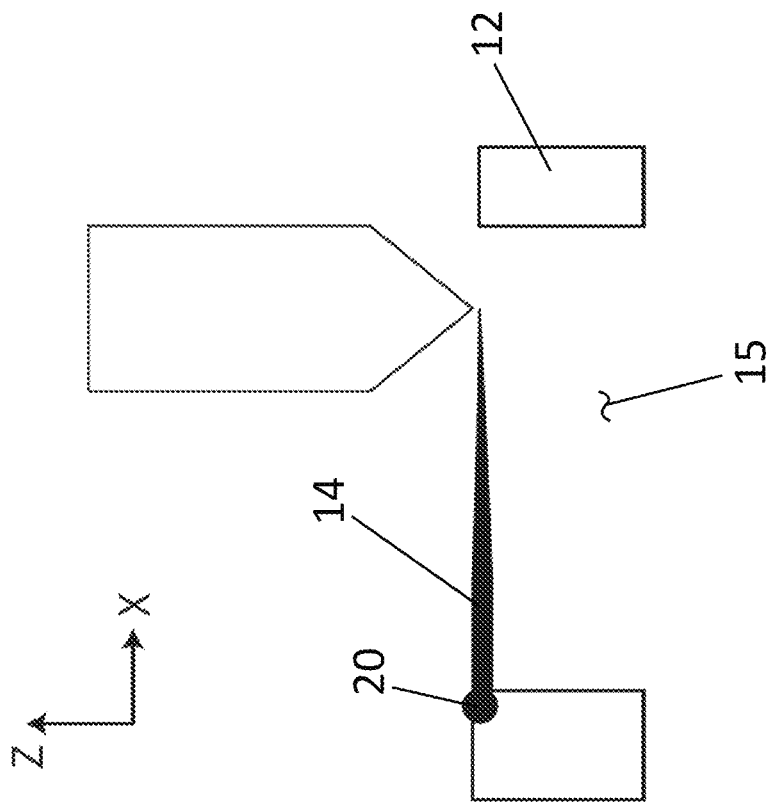
FIG. 10 is a schematic illustration similar to FIG. 9, but showing the nozzle forming a fiber of an inflatable structure using an extrude-and-pull method.

Any suitable way of additively manufacturing the fibers 14 can be used without departing from the scope of the disclosure. Two exemplary additive manufacturing processes are shown in FIGS. 9 and 10. Referring first to FIG. 9, one method of forming a fiber 14 inside the shell 12 is called "bridging." In the bridging method, for a given fiber 14 in a given layer 140, after printing the shell material for the XY plane, the print head (labeled 'nozzle') moves to a first location defined for the first end portion of the fiber 14. From this location, the print head simultaneously extrudes a single strand of filament and moves across the interior cavity 15 of the shell to a second location defined for the second end portion of the fiber 14. The bridging method produces fibers of uniform thickness. But by changing the extrusion rate and/or speed of travel for the print head, the thickness of the fibers 14 can be adjusted. It can also be seen that by selection of coordinates for appropriate end points, fibers can be formed to span any two locations in a given XY plane of the shell 12.

Referring to FIG. 10, another method of forming a fiber inside the shell is called "extrude-and-pull." In the extrude-and-pull method, after printing the shell material for the XY plane, the print head moves to a first location defined for the first end of the fiber. At this location, the print head extrudes a glob 20 of fiber material (molten filament). Then the print head moves across the interior cavity 15 to a second location on the shell 12 defined for the second end of the fiber 14. But while the print head moves to the second location, it is not simultaneously extruding filament. Rather, the nozzle of the print head is pulling viscous molten fiber material from the glob 20 across the shell cavity 15 to create the fiber 14. The extrude-and-pull method produces fibers of tapering cross-sectional dimension. The cross-sectional dimension of the fiber 14 gradually decreases from the first end portion toward the second end portion. Like with the bridging method, the extrude-and-pull method allows for adjustments in overall fiber cross-sectional dimension by adjusting the volume of the glob 20 and/or adjusting the speed of travel for the print head across the shell 12. And as with the bridging method, the extrude-and-pull method allows for any desired fiber orientation in a given print layer by selection of coordinates for appropriate end points along the shell 12.

The fibers 14 are preferably made of flexible material to allow the structure 10 to collapse and fold when uninflated. In one or more embodiments, the fiber material is the same material as the shell material. But in certain embodiments, the fiber material of at least some of the fibers can differ from the shell material.

Accordingly, it can be seen that the inflatable structure 10 is made up of an additively manufactured shell 12 and additively manufactured fibers 14 inside the shell. The inventors believe that additive manufacturing allows for the creation of inflatable structures with complex and intricate inflated geometries. The shell 12 can have any desired printed geometry, and the fibers 14 can be arrayed inside the shell in any desired manner to constrain the geometry of the shell 12 once it is inflated. Moreover, the inventors believe that the fibers 14 can be arrayed in such a way as to provide substantial inflation stiffness, similar to how drop stitch fabrics have been used to provide enhanced stiffness to prior art inflatables. When the inflatable structure 10 is inflated, it pulls the many fibers 14 inside the shell 12 tight. Thus, similar to a tensegrity structure, the shell 12 is in equipoise between the fibers 14 loaded in tension and the internal air loaded in compression. This creates a stiff structure capable of withstanding external load. But whereas drops stitch fabrics can only be used for a very limited set of geometries (specifically, two spaced apart surfaces that are mostly parallel), inflatable structures formed in accordance with the principles of the present disclosure can achieve high stiffness and load bearing capacity in complex inflated geometries. Because of their shape-retention and stiffness properties, the inventors believe that inflatable structures 10 formed in accordance with the principles of the present disclosure have the potential to form primary load-bearing structures, particularly in applications where there are requirements for ultra-light weight, complex geometries, and/or stowage.

Figure 11:
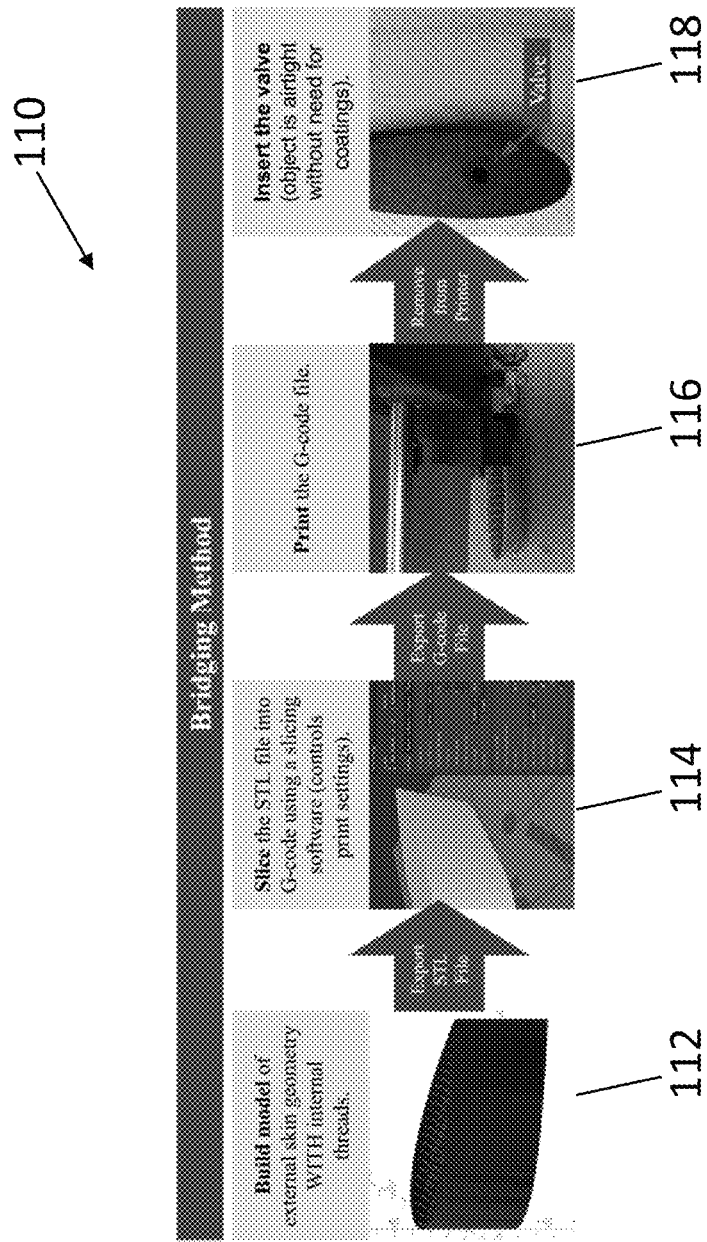
FIG. 11 is a flow chart of a method of forming an inflatable structure in which fibers are formed by the bridging method.

Referring to FIG. 11, an exemplary method of making an inflatable structure 10 in accordance with the present disclosure is generally indicated at reference number 110. In the method 110, all of the fibers 14 are formed by bridging, as shown in FIG. 9. The first step 112 comprises creating a three dimensional model for the inflatable structure 10 that includes the fibers 14. Preferably, step 112 comprises using a code-based CAD software in which a user can input specific thread parameters (position, density, thickness, etc.) and skin parameters (geometry, skin thickness, etc.), and the CAD software will automatically generate the model for the shell 12 and fibers 14. For example, a suitable code-based CAD software can be built on the open source software called OpenSCAD. After creating a three-dimensional model of the inflatable structure 10 that includes its threads 14, the model may be exported in an STL file. Then in step 114, processor-readable additive manufacturing instructions are created based on the 3D model created in step 112. For example, a commercially available slicing software can be used to create G-code from the exported STL file. Once the G-code is created, it can be uploaded to an additive manufacturing system for execution. The additive manufacturing system then forms the inflatable structure in accordance with the G-code instructions (step 116). In this process, the additive manufacturing system additively manufactures both the flexible shell 12 and the interior fibers 14 by executing the G-code. Optionally, after the inflatable structure 10 is printed in step 116, an inflation valve 18 can be installed in the valve retainer 16 in step 118.

Figure 12:
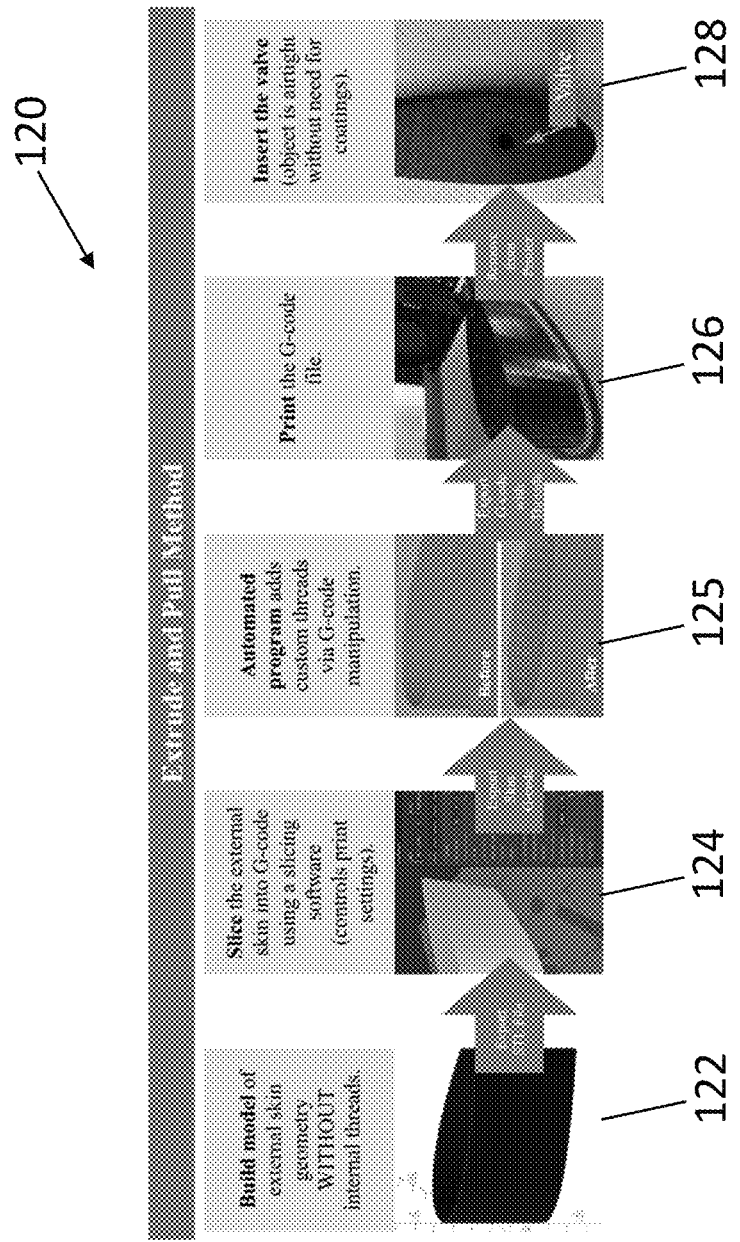
FIG. 12 is a flow chart of a method of forming an inflatable structure in which fibers are formed by the extrude-and-pull method.

Referring to FIG. 12, another exemplary method of making an inflatable structure 10 in accordance with the present disclosure is generally indicated at reference number 120. In the method 120, all of the fibers 14 are formed by extrude-and-pull, as shown in FIG. 10. The first step 122 comprises creating a three dimensional model for the inflatable structure 10. But unlike step 112 in the bridging method 110, step 122 comprises creating a three dimensional model for only the shell 12 of the inflatable structure 110. After creating a three-dimensional model for the shell 12 devoid of threads 14, the model may be exported in an STL file. Then in step 124, first G-code (broadly, first additive manufacturing instructions) is created based on the 3D model. Then in step 125, an automated program is used to modify the first G-code into second G-code (broadly, second additive manufacturing instructions) that contains instructions for the extrude-and-pull fibers. Once the second G-code is created in step 125, it can be uploaded to an additive manufacturing system for execution. The additive manufacturing system then forms the inflatable structure in accordance with the second G-code (step 126). In this process, the additive manufacturing system additively manufactures both the flexible shell 12 and the interior fibers 14 by executing the G-code. Optionally, after the inflatable structure 10 is printed in step 126, an inflation valve 18 can be installed in the valve retainer 16 in step 128.

Figure 13:
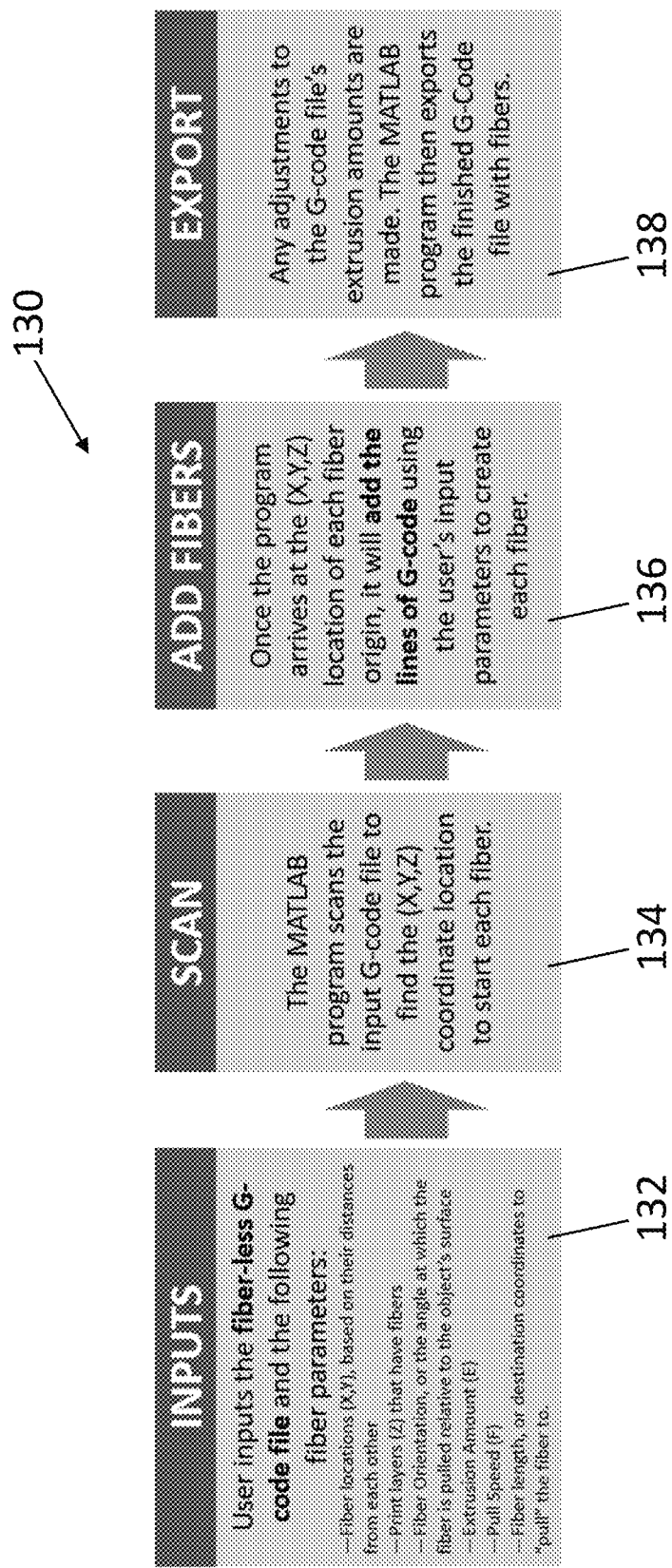
FIG. 13 is a flow chart of a software-executable method for composing additive manufacturing instructions for an inflatable structure including extrude-and-pull fibers.

Referring to FIG. 13, the inventors have developed a MATLAB software module for performing step 125 in the extrude-and-pull method 120. The MATLAB software module is configured to conduct a process 130 for converting the first G-code for the shell 12 with no extrude-and-pull fibers to second G-code for the shell with extrude-and-pull fibers. The process 130 comprises a first step 132 of receiving inputs. The inputs received in step 132 include the first G-code and one or more fiber parameters. In the illustrated embodiment, the MATLAB software is configured to prompt the user for inputs of the following fiber parameters: fiber location, XY print layers with fibers, fiber orientation, extrusion amount, pull speed, and fiber length. In response to receiving the inputs, the MATLAB software module next performs a step 134 to scan the input G-code to find the starting coordinates for each fiber. This corresponds to the location where the print head will extrude the glob 20 (FIG. 10) on the shell 12 for the fiber 14. After the MATLAB software module determines the starting location for each fiber, in step 134, it adds lines of G-code for each fiber 14 based on the fiber parameters input in step 132. Finally, in step 136, the MATLAB software module outputs the second G-code that incorporates both the shell 12 and the extrude-and-pull fibers.

Figure 14:
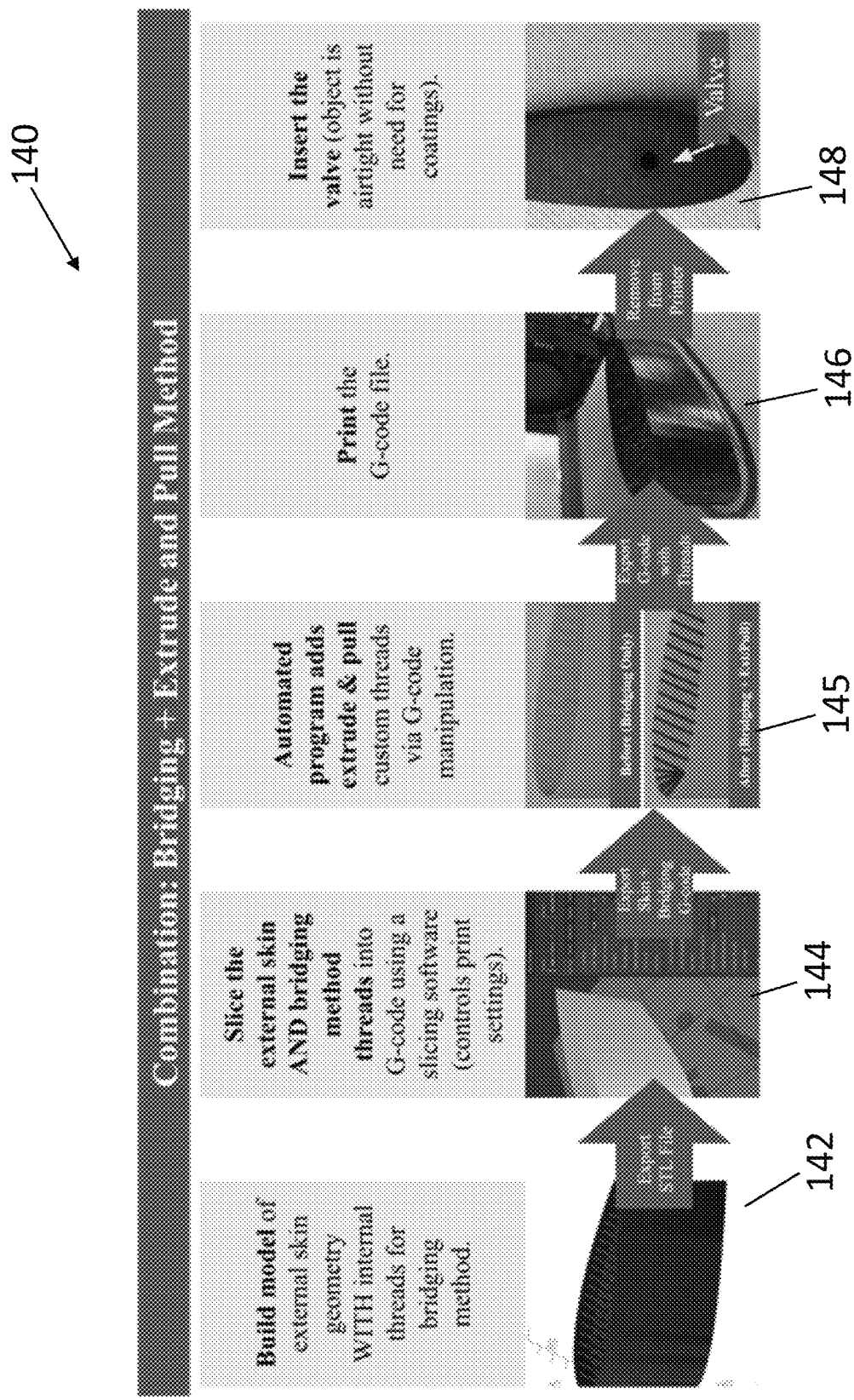
FIG. 14 is a flow chart of a method of forming an inflatable structure in which some fibers are formed by the bridging method and other fibers are formed by the extrude-and-pull method.

Referring to FIG. 14, another exemplary method of making an inflatable structure 10 in accordance with the present disclosure is generally indicated at reference number 140. In the method 140, some of the fibers 14 are formed by bridging and others by extrude-and-pull. The first step 142 comprises creating a three dimensional model for the inflatable structure 10. In step 142 the model is created to include the shell and bridging fibers but does not include extrude-and-pull fibers. After creating a three-dimensional model for the shell 12 and bridging threads, the model may be exported in an STL file. Then in step 144, first G-code (broadly, first additive manufacturing instructions) is created based on the 3D model. Then in step 145, the MATLAB software module is used to modify the first G-code into second G-code (broadly, second additive manufacturing instructions) that contains instructions for the extrude-and-pull fibers. Once the second G-code is created in step 145, it is exported to an additive manufacturing system for execution. The additive manufacturing system then forms the inflatable structure in accordance with the second G-code (step 146). In this process, the additive manufacturing system additively manufactures the flexible shell 12, forms some of the fibers 14 by bridging, and forms others of the fibers by extrude-and-pull. Optionally, after the inflatable structure 10 is printed in step 146, an inflation valve 18 can be installed in the valve retainer 16 in step 148.

EXAMPLES

Figure 15:
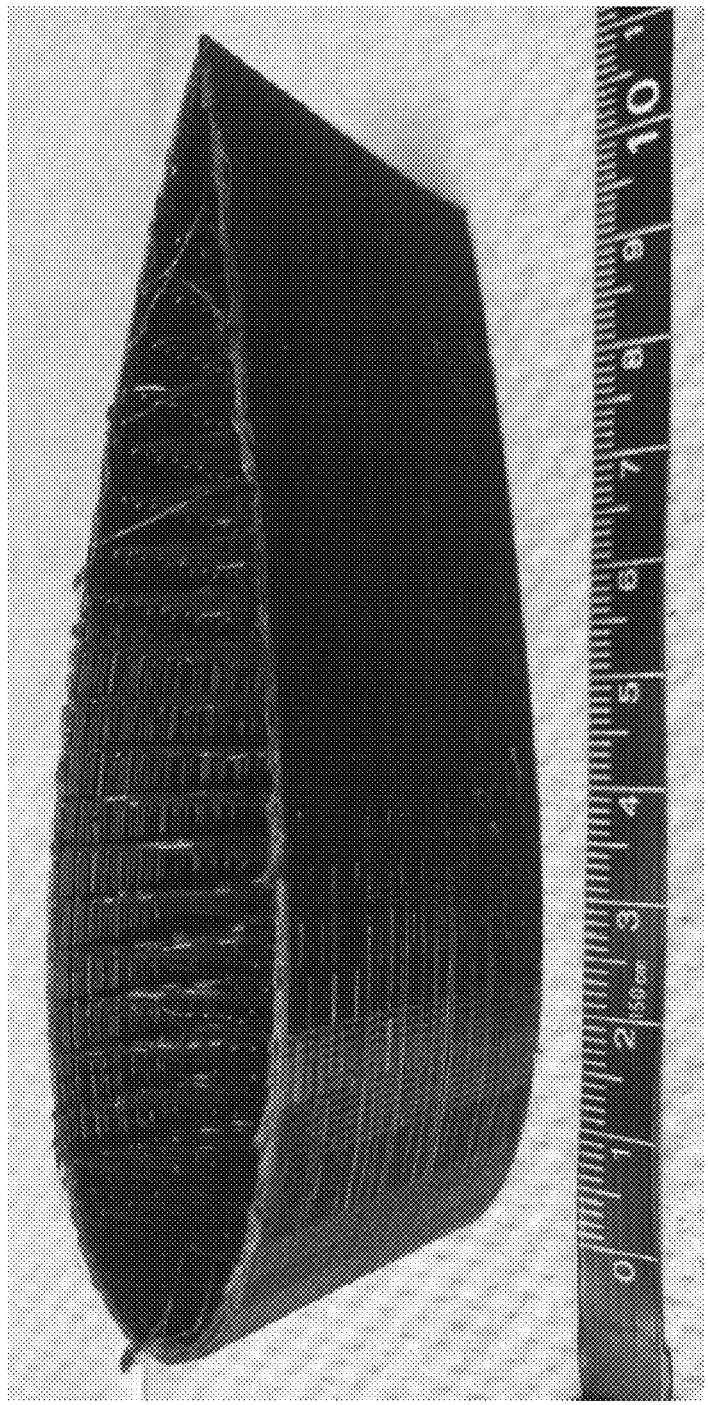
FIGS. 15-29 are photographs of example additively manufactured structures that demonstrate proof of concept for inflatable structures in the scope of this disclosure.
Figure 16:
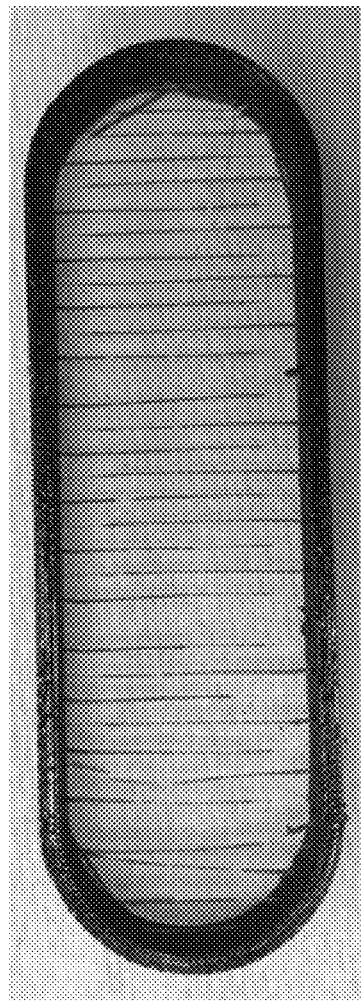
Figure 17:
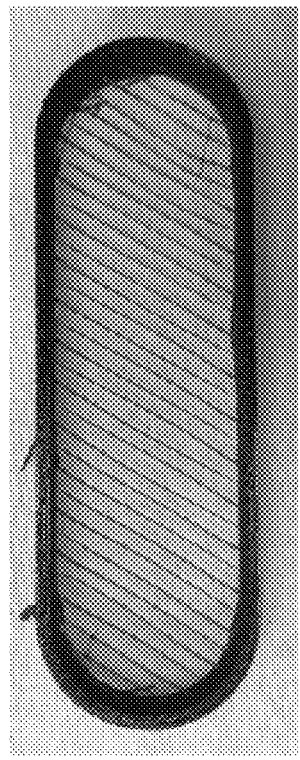
Figure 18:
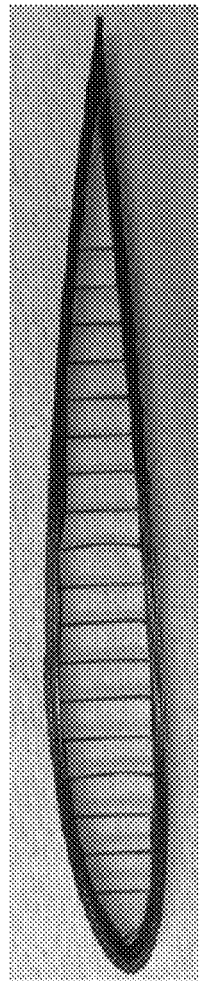
Figure 19:
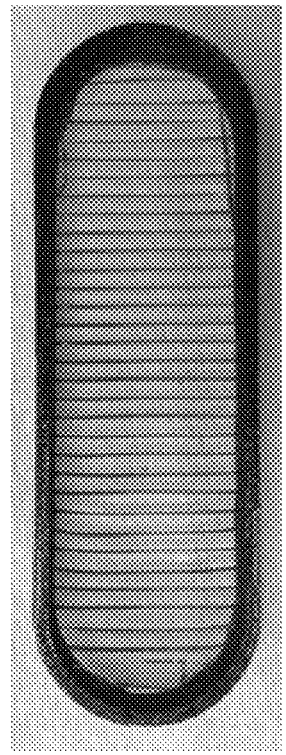
Figure 20:
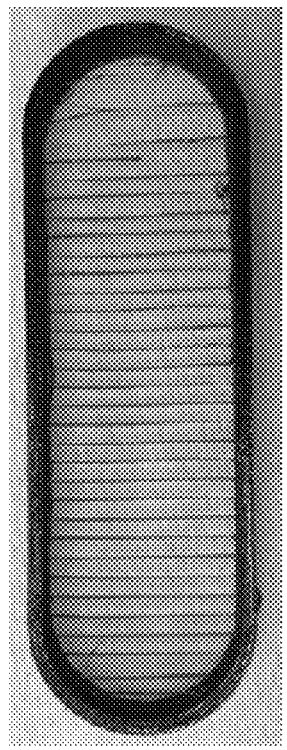
Figure 21:
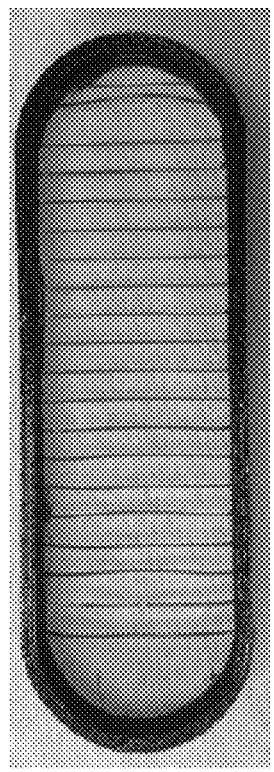

Referring now to FIGS. 15-29, photographs of several additively manufactured structures are provided to show that the structures and manufacturing processes disclosed above can feasibly produce inflatable structures as proposed. FIG. 15 is a photograph of an airfoil-shaped shell with multiple layers of internal fibers additively manufactured using the principles of the present disclosure. FIG. 16 shows an additively manufactured structure formed with one layer of very thin threads formed by the bridging method. FIG. 17 shows an additively manufactured structure formed with one layer of thicker threads formed by the bridging method and extending at an oblique angle. FIG. 18 shows an additively manufactured structure formed with one layer of threads formed by bridging across a shell of a thin airfoil shape. FIGS. 19-21 show three different additively manufactured structures, each with a single layer of fibers formed using the extrude-and-pull method. Relative to the example in FIG. 19, the example in FIG. 20 has thinner fibers, and the example in FIG. 21 has fewer fibers.

Figure 22:
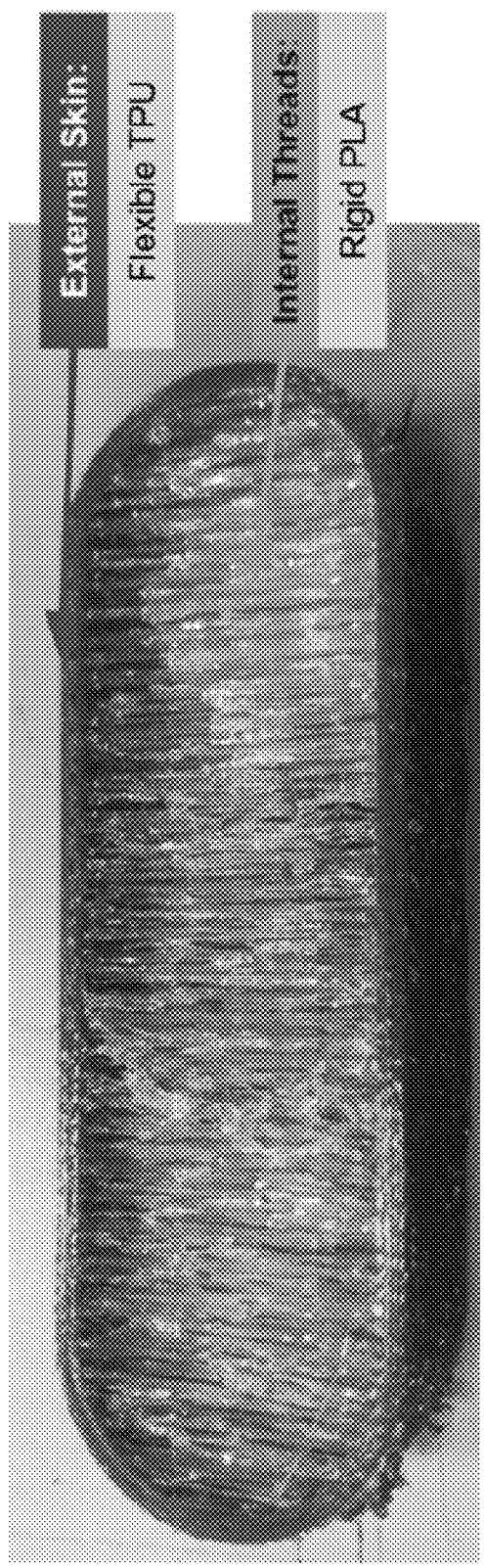

FIG. 22 is a photograph of a shell with multiple layers of internal fibers, wherein the fiber material is different than the shell material.

Figure 23:
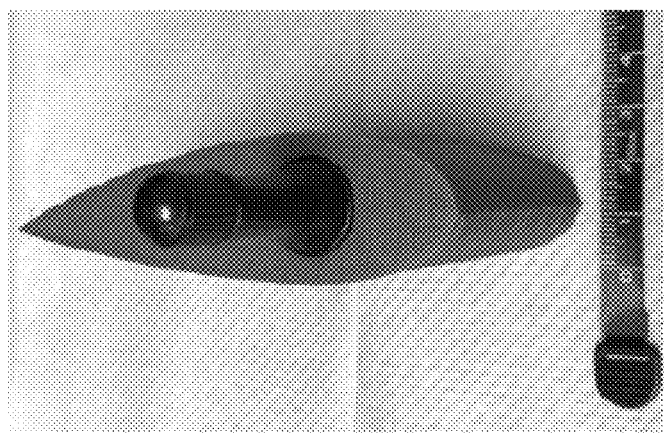
Figure 24:
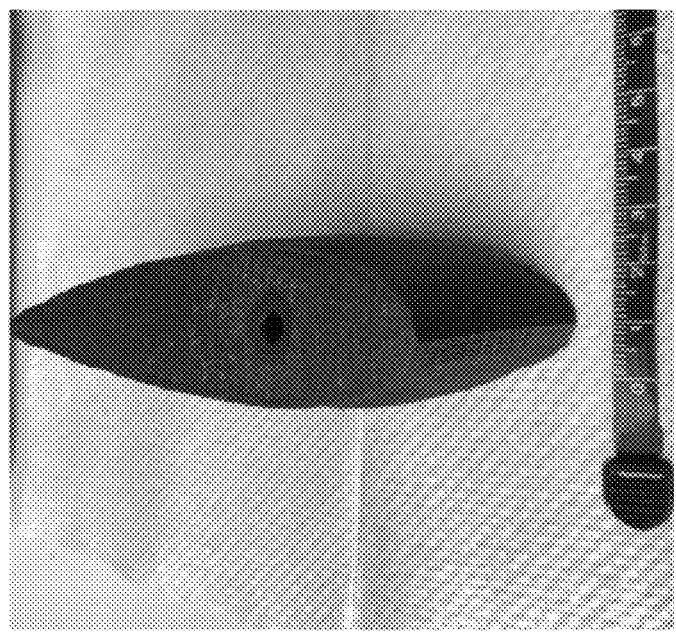

FIG. 23 is a photograph of a fully-formed inflatable structure with an externally mounted inflation valve. FIG. 24 is a photograph of a fully-formed inflatable structure with an internally mounted inflation valve.

Figure 27:
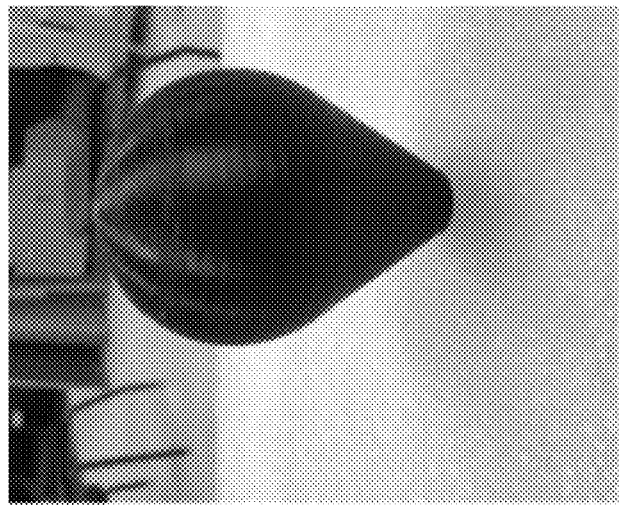
Figure 26:
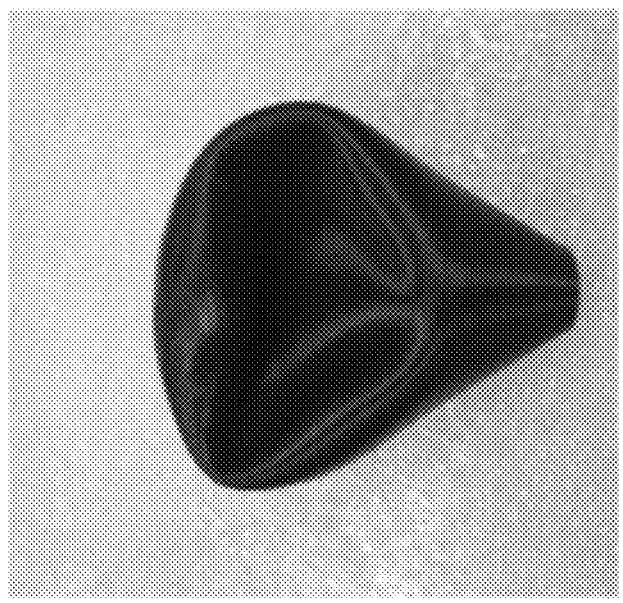
Figure 25:

FIGS. 25-27 are three photographs of the same inflatable structure. In FIG. 25, the inflatable structure is uninflated and folded. In FIG. 26, the inflatable structure is uninflated, collapsed but not folded. In FIG. 27, the inflatable structure is inflated.

Figure 28:
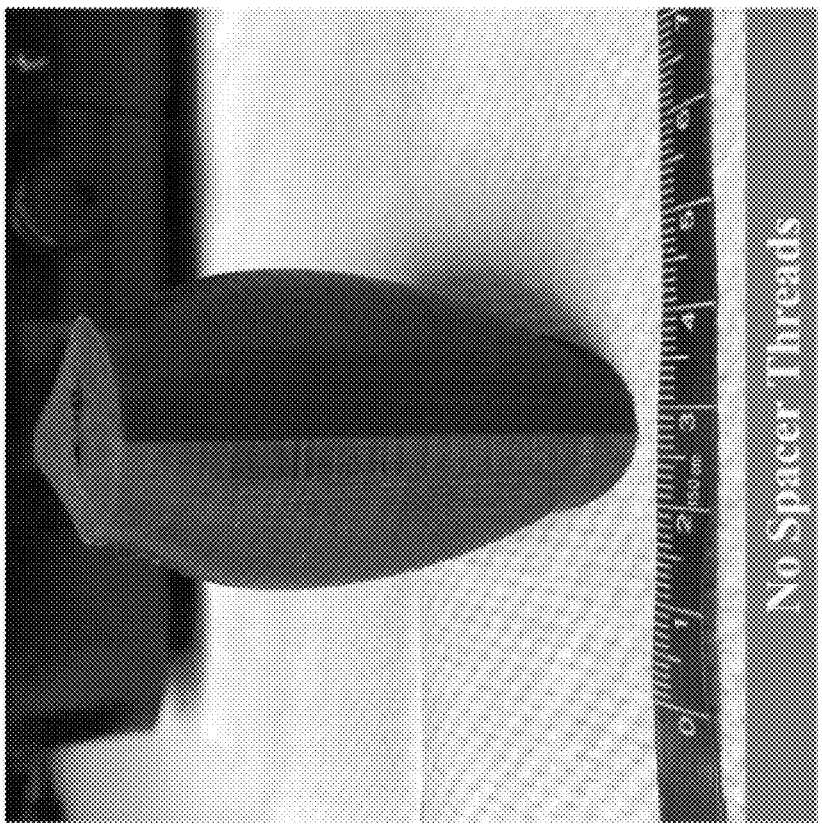
Figure 29:
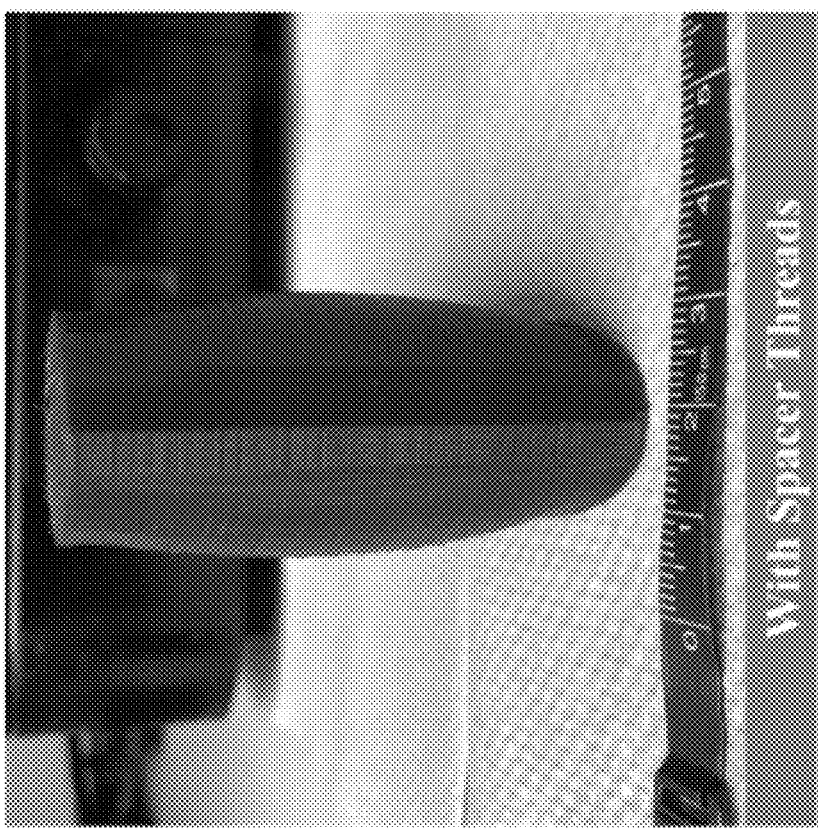

FIGS. 28 and 29 are photographs of two additively manufactured inflatable structures. In both photographs, the structures were manufactured to the same shell geometry and using the same shell print parameters. And in both photographs, the shells were inflated to the same internal pressure. The only difference between the structures in the two photographs is that no internal fibers are used in the inflatable structure of FIG. 28. By contrast, the inflatable structure of FIG. 29 is formed with internal fibers in accordance with the principles of the present disclosure. As can be seen by comparing FIGS. 28 and 29, the fibers have a significant effect on the inflated geometry of the structure. Moreover, the printed fibers imparted notable stiffness and load bearing capacity to the structure in FIG. 29 as compared with the structure in FIG. 28.

The inflated structures in FIGS. 27 and 29 are able to hold pressure as additively manufactured, without any additional sealant added to the shells. The inventors have found that the structures had no pressure loss when kept inflated for a period of two weeks.

Embodiments of the present disclosure may comprise a special purpose computer including a variety of computer hardware, as described in greater detail herein.

For purposes of illustration, programs and other executable program components may be shown as discrete blocks. It is recognized, however, that such programs and components reside at various times in different storage components of a computing device, and are executed by a data processor(s) of the device.

Although described in connection with an example computing system environment, embodiments of the aspects of the invention are operational with other special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the example operating environment. Examples of computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the present disclosure may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the present disclosure may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments may be implemented with processor-executable instructions. The processor-executable instructions may be organized into one or more processor-executable components or modules on a tangible processor readable storage medium. Also, embodiments may be implemented with any number and organization of such components or modules. For example, aspects of the present disclosure are not limited to the specific processor-executable instructions or the specific components or modules illustrated in the figures and described herein. Other embodiments may include different processor-executable instructions or components having more or less functionality than illustrated and described herein.

The order of execution or performance of the operations in accordance with aspects of the present disclosure illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of the invention.

When introducing elements of the invention or embodiments thereof, the articles "a," "an," "the," and "said" are intended to mean that there are one or more of the elements. The terms "comprising," "including," and "having" are intended to be inclusive and mean that there may be additional elements other than the listed elements.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively, or in addition, a component may be implemented by several components.

The above description illustrates embodiments by way of example and not by way of limitation. This description enables one skilled in the art to make and use aspects of the invention, and describes several embodiments, adaptations, variations, alternatives and uses of the aspects of the invention, including what is presently believed to be the best mode of carrying out the aspects of the invention. Additionally, it is to be understood that the aspects of the invention are not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

It will be apparent that modifications and variations are possible without departing from the scope of the invention defined in the appended claims. As various changes could be made in the above constructions and methods without departing from the scope of the invention, it is intended that all matter contained in the above description and shown in the accompanying drawings shall be interpreted as illustrative and not in a limiting sense.

In view of the above, it will be seen that several advantages of the aspects of the invention are achieved and other advantageous results attained.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in simplified form that are further described in the Detailed Description. The Summary is not intended to identify key features or essential features of the claimed subject matter, nor is it intended to be used as an aid in determining the claimed subject matter.

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the disclosure are achieved and other advantageous results attained.

As various changes could be made in the above products and methods without departing from the scope of the disclosure, it is intended that all matter contained in the above description shall be interpreted as illustrative and not in a limiting sense.

What is claimed is:

1. A method of making an inflatable structure, the method comprising:
    additively manufacturing a flexible shell of the inflatable structure, the flexible shell defining an internal cavity; and additively manufacturing a plurality of fibers across within the internal cavity of the flexible shell so that the fibers are configured to constrain the flexible shell to have a fiber-constrained shape when the flexible shell is expanded,
    wherein additively manufacturing the plurality of fibers, for at least some of the fibers, comprises forming a single-filament fiber across the internal cavity of the flexible shell; and wherein said forming the single-filament fiber comprises fusing first end portion of the single-filament fiber to the flexible shell at a first location along the flexible shell and fusing a second end portion of the single-filament fiber to the flexible shell at a second location along the flexible shell.

2. The method of claim 1, wherein said additively manufacturing the plurality of fibers comprises, for at least some of the fibers, forming a glob of fiber material on the shell at a respective first fiber location and pulling the glob of fiber material across the shell to a respective second fiber location.

3. The method of claim 1, wherein said additively manufacturing the plurality of fibers comprises, for at least some of the fibers, extruding fiber material across the shell from a respective first fiber location to a second fiber location.

4. The method of claim 1, wherein additively manufacturing the shell comprises forming a valve retainer in the shell and the method further comprises installing an inflation valve in the valve retainer.

5. The method of claim 1, further comprising receiving first additive manufacturing instructions for the shell, receiving fiber parameters for the plurality of fibers, and creating second additive manufacturing instructions for the shell and fibers based on the first additive manufacturing instructions and the fiber parameters.

6. The method of claim 5, wherein both of said additively manufacturing the flexible shell and said additively manufacturing the plurality of fibers are performed by executing the second additive manufacturing instructions.

7. The method of claim 1, wherein said additively manufacturing the flexible shell forms the shell to be airtight.

8. The method of claim 1, wherein said additively manufacturing the flexible shell comprises forming a wall that circumscribes the internal cavity by extruding a molten filament to form the wall of the flexible shell.

9. The method of claim 8, wherein said additively manufacturing the flexible shell comprises extruding at least 3 layers of molten filament to form the wall.

10. The method of claim 1, wherein said forming the single-filament fiber comprises fusing the single-filament fiber to the flexible shell without penetrating the flexible shell.

11. The method of claim 1, wherein said additively manufacturing the plurality of fibers comprises forming at least some of the plurality of fibers from a first material different than a second material used to form the flexible shell.

12. The method of claim 11, wherein the first material comprises a polylactic acid material and the second material comprises a thermoplastic polyurethane material.

13. The method of claim 1, wherein said additively manufacturing the plurality of fibers comprises orienting some of the plurality of fibers transverse to the others of the plurality of fibers to form a non-woven fibrous mesh.

14. The method of claim 1, wherein said additively manufacturing the flexible shell comprises utilizing an additive manufacturing process selected from a group of additive manufacturing processes consisting of fused deposition modeling and fused filament fabrication.

15. The method of claim 1, wherein the fiber-constrained shape is an airfoil shape.

16. A method of using an inflatable structure made in accordance with the method of claim 1, comprising inflating the inflatable structure and tensioning the plurality of fibers to constrain the flexible shell.

17. A method of using an inflatable structure made in accordance with the method of claim 1, comprising collapsing the inflatable structure by deflating the inflatable structure.

18. A method of using an inflatable structure made in accordance with the method of claim 1, comprising collapsing the inflatable structure by deflating the inflatable structure and folding the inflatable structure for stowage.

* * * * *